United States Patent

An (10) Patent No.: US 9,595,381 B2
(45) Date of Patent: Mar. 14, 2017

(54) SHIELDING APPARATUS AND WIRELESS POWER TRANSMISSION APPARATUS

(71) Applicant: LG INNOTEK CO., LTD., Seoul (KR)

(72) Inventor: Jeong Wook An, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 882 days.

(21) Appl. No.: 13/659,008

(22) Filed: Oct. 24, 2012

(65) Prior Publication Data

US 2013/0099589 A1   Apr. 25, 2013

(30) Foreign Application Priority Data

Oct. 24, 2011   (KR) .................. 10-2011-0108960

(51) Int. Cl.
*H05K 9/00* (2006.01)
*H01F 38/14* (2006.01)
(Continued)

(52) U.S. Cl.
CPC ............. *H01F 38/14* (2013.01); *H01F 27/36* (2013.01); *H04B 5/0037* (2013.01);
(Continued)

(58) Field of Classification Search
CPC .... H01F 27/36; H01F 38/14; H01F 2003/106; H04B 5/0081; H04B 5/0037; H02J 7/025; H02J 5/005
(Continued)

(56) References Cited

U.S. PATENT DOCUMENTS

| 5,223,849 A | * | 6/1993 | Kasevich | ........... H01Q 15/0026 |
| | | | | 343/895 |
| 6,785,519 B2 | | 8/2004 | Toyoda et al. | |

(Continued)

FOREIGN PATENT DOCUMENTS

| CN | 101486262 A | 7/2009 |
| CN | 201533482 U | 7/2010 |

(Continued)

OTHER PUBLICATIONS

Machine translation of CN 201533482, Guoliang, Jul. 21, 2010.*

(Continued)

*Primary Examiner* — Rexford Barnie
*Assistant Examiner* — Elim Ortiz
(74) *Attorney, Agent, or Firm* — Saliwanchik, Lloyd & Eisenschenk (57) ABSTRACT

Disclosed are a shielding apparatus and a wireless power transmission apparatus. The shielding apparatus included in a wireless power transmission apparatus for transmitting power to a wireless power reception apparatus in wireless includes a first shielding unit changing a transmission path of a portion of a magnetic field generated from a transmission coil of the wireless power transmission apparatus, and a second shielding unit shielding the portion of the magnetic field which has passed through the first shielding unit. The second shielding unit is placed on the first shielding unit. A real component value of permeability of the first shielding unit is greater than an imaginary component value of the permeability of the first shielding unit, and an imaginary component value of permeability of the second shielding unit is greater than a real component value of the permeability of the second shielding unit.

11 Claims, 4 Drawing Sheets

(51) Int. Cl.
*H01F 27/36* (2006.01)
*H04B 5/00* (2006.01)
*H02J 7/02* (2016.01)
*H01F 3/10* (2006.01)
*H02J 5/00* (2016.01)

(52) U.S. Cl.
CPC ..... *H04B 5/0081* (2013.01); *H01F 2003/106* (2013.01); *H02J 5/005* (2013.01); *H02J 7/025* (2013.01)

(58) Field of Classification Search
USPC .......................................... 307/104; 174/350
See application file for complete search history.

(56) References Cited

U.S. PATENT DOCUMENTS

| | | | |
|---|---|---|---|
| 9,013,068 B2* | 4/2015 | Ryu | H02J 17/00 307/104 |
| 2003/0146801 A1* | 8/2003 | Wiltshire | H01P 3/12 333/12 |
| 2003/0146802 A1* | 8/2003 | Wiltshire | H05K 9/0075 333/24 R |
| 2009/0021212 A1 | 1/2009 | Hasegawa et al. | |
| 2009/0212637 A1* | 8/2009 | Baarman | H01F 7/0247 307/104 |
| 2009/0230777 A1 | 9/2009 | Baarman et al. | |
| 2009/0267558 A1 | 10/2009 | Jung | |
| 2010/0181842 A1 | 7/2010 | Suzuki et al. | |
| 2010/0257725 A1 | 10/2010 | Akiho et al. | |
| 2011/0050164 A1* | 3/2011 | Partovi | H01F 5/003 320/108 |
| 2011/0109265 A1 | 5/2011 | Hui | |
| 2012/0182094 A1* | 7/2012 | Kawamura | H01Q 1/24 333/239 |
| 2012/0242447 A1* | 9/2012 | Ichikawa | B60L 11/182 336/84 C |
| 2012/0306265 A1 | 12/2012 | Yamamoto et al. | |
| 2015/0124402 A1* | 5/2015 | Jang | B32B 27/08 361/679.55 |

FOREIGN PATENT DOCUMENTS

| | | |
|---|---|---|
| EP | 0785557 B1 | 10/1999 |
| EP | 2017860 A2 | 1/2009 |
| JP | 09-035927 A | 2/1997 |
| JP | 10-313192 A | 11/1997 |
| JP | 2003297629 A | 10/2003 |
| JP | 2005-327245 | 11/2005 |
| JP | 2005354106 A | 12/2005 |
| JP | 2006-245950 | 9/2006 |
| JP | 2007-201113 | 8/2007 |
| JP | 2007-295558 A | 11/2007 |
| JP | 2009-005475 | 1/2009 |
| JP | 2009-076513 A | 4/2009 |
| JP | 2009-120454 A | 6/2009 |
| JP | 2009268334 A | 11/2009 |
| JP | 2010-072957 A | 4/2010 |
| JP | 2010-119187 | 5/2010 |
| JP | 2010-252498 | 11/2010 |
| JP | 2010283263 A | 12/2010 |
| JP | 2011166994 A | 8/2011 |
| JP | 2011-181769 A | 9/2011 |
| TW | 2010-04087 A | 1/2010 |
| WO | WO-2011-074091 A1 | 6/2011 |

OTHER PUBLICATIONS

Supplementary European Search Report dated Apr. 4, 2014 in European Application No. 12188604.8.
Office Action dated Feb. 16, 2016 in Japanese Application No. 2015-084536.

* cited by examiner

SHIELDING APPARATUS AND WIRELESS POWER TRANSMISSION APPARATUS

CROSS-REFERENCE TO RELATED APPLICATION

This application claims the benefit under 35 U.S.C. §119 of Korean Patent Application No. 10-2011-0108960, filed Oct. 24, 2011, which is hereby incorporated by reference in its entirety.

BACKGROUND

The disclosure relates to a shielding apparatus and a wireless power transmission apparatus. The disclosure relates to a wireless power transmission technology capable of improving power transmission efficiency and minimizing the quantity of a magnetic field to be leaked to the outside.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer method.

Recently, among the wireless power transmission technologies, an energy transfer method using resonance has been extensively used.

Since a wireless power transmission system based on resonance transmits electrical signals formed at transmitter and receiver sides through a coil in wireless, a user can easily charge an electronic device such as a portable device with electricity.

However, according to the energy transfer method employing resonance, another device may erroneously operate due to an electromagnetic wave generated from the transmitter. The electromagnetic wave, which is exposed to a human body, may exert a harmful influence on the health of the human body.

BRIEF SUMMARY

The disclosure provides a shielding apparatus, capable of improving the power transmission efficiency between a wireless power transmission apparatus and a wireless power reception apparatus, and the wireless power transmission apparatus.

The disclosure provides a shielding apparatus, capable of inhibiting another device from erroneously operating, and minimizing the quantity of a magnetic field to be leaked to the outside so that the situation of leaking the magnetic field harmful to a human body can be inhibited, and a wireless power transmission apparatus.

According to the embodiment, there is provided a shielding apparatus included in a wireless power transmission apparatus for transmitting power to a wireless power reception apparatus in wireless, which includes a first shielding unit changing a transmission path of a portion of a magnetic field generated from a transmission coil of the wireless power transmission apparatus, and shielding the portion of the magnetic field which has passed through the first shielding unit. The second shielding unit is placed on the first shielding unit. A real component value of permeability of the first shielding unit is greater than an imaginary component value of the permeability of the first shielding unit, and an imaginary component value of permeability of the second shielding unit is greater than a real component value of the permeability of the second shielding unit.

According to the embodiment, there is provided a wireless power transmission apparatus for transmitting power to a wireless power reception apparatus in wireless. The wireless power transmission apparatus includes a transmission unit receiving power from a power source and transferring a magnetic field generated from a transmission coil to a reception coil of the wireless power reception apparatus through a non-radiation method, and a shielding device including a first shielding unit changing a transmission path of a portion of the magnetic field generated from the transmission coil, and a second shielding unit placed on the first shielding unit and shielding a portion of a magnetic field which has passed through the first shielding unit. A real component value of permeability of the first shielding unit is greater than an imaginary component value of the permeability of the first shielding unit, and an imaginary component value of permeability of the second shielding unit is greater than a real component value of the permeability of the second shielding unit.

According to the embodiment, there is provided a shielding apparatus included in a transmission apparatus communicating with a reception apparatus by using a magnetic field. The shielding apparatus includes a first shielding unit changing a transmission path of a portion of a magnetic field generated from the transmission apparatus, and a second shielding unit placed on the first shielding unit and shielding the portion of the magnetic field which has passed through the first shielding unit. A real component value of permeability of the first shielding unit is greater than an imaginary component value of the permeability of the first shielding unit, and an imaginary component value of permeability of the second shielding unit is greater than a real component value of the permeability of the second shielding unit.

As described above, the embodiment of the disclosure has following effects.

First, the radiation quantity of an electromagnetic field to be leaked to the outside in the wireless power transmission process can be reduced, thereby inhibiting another device from erroneously operating and minimizing a harmful influence exerted on a human body.

Second, the power efficiency can be maximized by changing the transmission path of a magnetic field through a shielding apparatus.

DETAILED DESCRIPTION

Terms and words used in the specification and the claims shall not be interpreted as commonly-used dictionary meanings, but shall be interpreted as to be relevant to the technical scope of the invention based on the fact that the inventor may property define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

Figure 1:
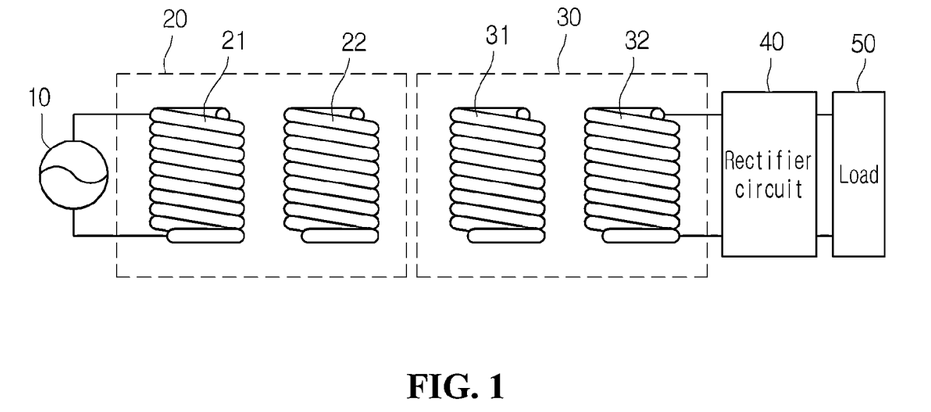
FIG. 1 is a view showing a wireless power transmission system according to one embodiment of the disclosure.

FIG. 1 is a view showing a wireless power transmission system according to the embodiment of the disclosure.

The power generated from a power source 10 is provided to a power transmitting unit 20, such that the power transmitting unit 20 transmits the power using resonance to a power receiving unit 30, which is resonant with the power transmitting unit 20 and has the same resonant frequency value as that of the power transmitting unit 20. The power transferred to the power receiving unit 30 is transferred via a rectifier circuit 40 to a load 50. The load 50 may be a battery or a predetermined apparatus which needs power.

In detail, the power source 10 is an AC power source for supplying AC power of a predetermined frequency.

The power transmitting unit 20 includes a transmission induction coil 21 and a transmission resonant coil 22. The transmission induction coil 21 is connected to the power source 10, such that AC current flows through the transmission induction coil 21. When AC current flows through the transmission induction coil 21, AC current is induced to the transmission resonant coil 22 physically spaced apart from the transmission induction coil 21 due to electromagnetic induction. The power transferred to the transmission resonant coil 22 is transmitted using resonance to the power receiving unit 30 which forms a resonance circuit with the power transmitting unit 20.

The power can be transmitted between two LC circuits, which are impedance-matched with each other, due to resonance. The power transmission method using the resonance can transmit the power farther than the power transmission method using the electromagnetic induction with the higher power transmission efficiency.

The power receiving unit 30 includes a reception resonant coil 31 and a reception induction coil 32. The power transmitted from the transmission resonant coil unit 22 is received at the reception resonant coil 31, so that the AC current flows through the reception resonant coil 31. The power transmitted to the reception resonant coil 31 is transferred by electromagnetic induction to the reception induction coil 32. The power transferred to the reception induction coil 32 is rectified by the rectifier circuit 40 and then transferred to the load 50.

Figure 2:
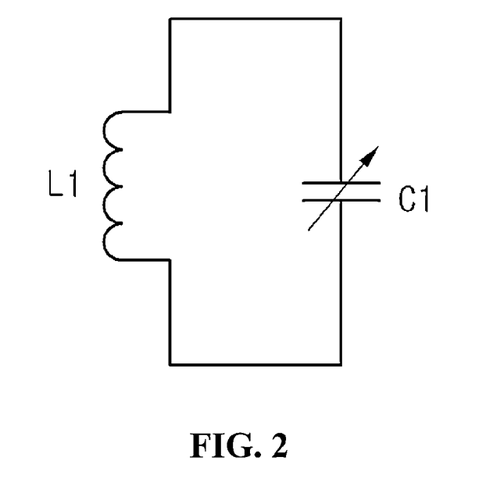
FIG. 2 is a circuit diagram showing an equivalent circuit of a transmission induction coil according to one embodiment of the disclosure.

FIG. 2 is an equivalent circuit diagram of the transmission induction coil 21 according to the embodiment of the disclosure. As shown in FIG. 2, the transmission induction coil 21 may include an inductor L1 and a capacitor C1, and form a circuit having a suitable inductance value and a suitable capacitance value. The capacitor C1 may be a variable capacitor. The impedance matching can be performed by adjusting a variable capacitor. Meanwhile, equivalent circuits of the transmission resonant coil 22, the reception resonant coil 31, and the reception induction coil 32 may be equal to that shown in FIG. 2.

Figure 3:
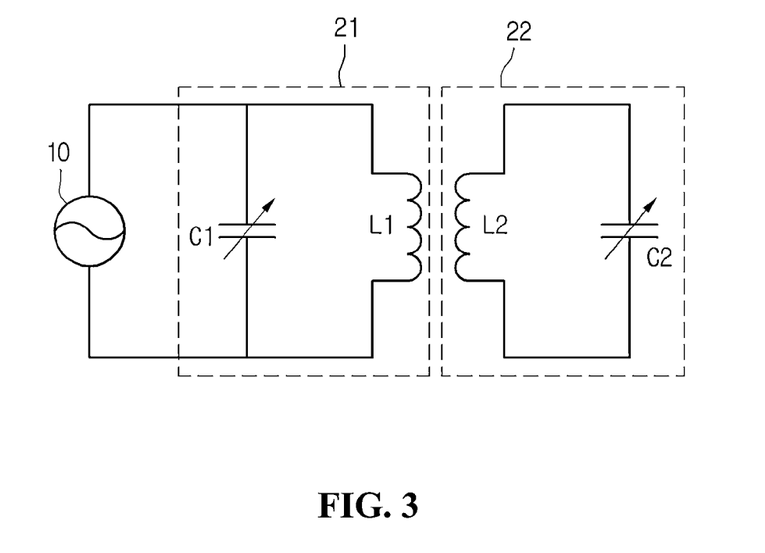
FIG. 3 is a circuit diagram showing an equivalent circuit of a power source and a transmission unit according to one embodiment of the disclosure.

FIG. 3 is an equivalent circuit diagram of the power source 10 and the power transmitting unit 20 according to the embodiment of the disclosure. As shown in FIG. 3, each of the transmission resonance coil 21 and the transmission resonance coil 22 may include an inductor L1 or L2 and a capacitor C1 or C2 having a predetermined inductance value and a predetermined capacitance value, respectively.

Figure 4:
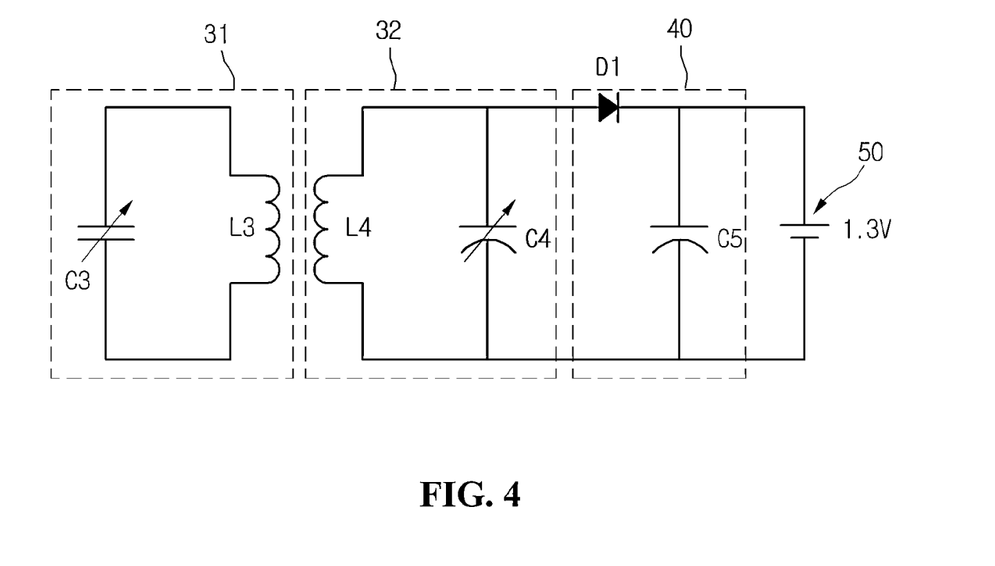
FIG. 4 is a circuit diagram showing an equivalent circuit of a reception resonant coil, a reception induction coil, a smoothing circuit, and a load according to one embodiment of the disclosure.

FIG. 4 is an equivalent circuit diagram of the reception resonant coil 31, the reception induction coil 32, the smoothing circuit 40 and the load 50 according to the embodiment of the disclosure.

As shown in FIG. 4, each of the transmission resonant coil 31 and the reception induction coil 32 may include an inductor L3 or L4 and a capacitor C3 or C4 having a predetermined inductance value and a predetermined capacitance value, respectively. The smoothing circuit 40 may include a diode D1 and a smoothing capacitor C5 to convert AC power into DC power to be output. Although the load 50 is denoted as a 1.3 V DC power source, the load 50 may be a battery or other devices requiring DC power.

Figure 5:
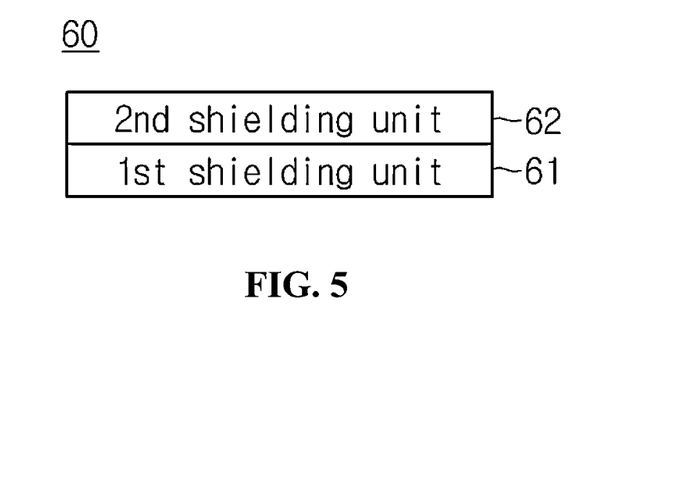
FIG. 5 is a block diagram showing a shielding apparatus according to one embodiment of the disclosure.

FIG. 5 is a block diagram showing a shielding apparatus 60 according to one embodiment of the disclosure.

Referring to FIG. 5, the shielding apparatus 60 includes first and second shielding units 61 and 62.

The shielding apparatus 60 according to one embodiment of the disclosure is applicable to both of wireless power transmission methods using electromagnetic induction and resonance.

The shielding apparatus 60 can change the transmission path of a portion of a magnetic field, which is transmitted from the wireless power transmission apparatus 100 to the wireless power reception apparatus 200, or can shield a portion of the magnetic field to be leaked to the outside.

The first shielding unit 61 can change the transmission path of a portion of the magnetic field produced from the transmission resonance coil 22 of the wireless power transmission apparatus 100.

The first shielding unit 61 changes the transmission path of the portion of the magnetic field produced from the transmission resonance coil 22 to the wireless power reception apparatus 200, so that the great quantity of the magnetic field can be transmitted to the wireless power reception apparatus 200. In other words, the power transmission efficiency between the wireless power transmission apparatus 100 and the wireless reception apparatus 200 can be increased due to the first shielding unit 61.

The second shielding unit 62 can shield the magnetic field, which has been produced from the transmission resonance coil 22 and has passed through the first shielding unit 61, from being leaked to the outside. In other words, the second shielding unit 62 absorbs a portion of the magnetic field, which has passed through the first shielding unit 61, and converts the magnetic field into thermal energy, thereby inhibiting the magnetic field from being leaked to the outside. If the quantity of a magnetic field to be leaked to the outside is reduced, the magnetic field harmful to the human body is not exposed to the human body.

The first and second shielding units 61 and 62 include difference types of magnetic substances.

The first and second shielding units 61 and 62 may include spinel, hexa, sandust, and permalloy magnetic substances. For example, the first shielding unit 61 may include the spinel magnetic substance, and the second shielding unit 62 may include the hexa magnetic substance. However, the first shielding unit 61 is not limited to the spinel magnetic substance, but the first shielding unit 61 may include the hexa magnetic substance or the garnet magnetic substance. In this case, the second shielding unit 62 may include the spinel magnetic substance.

Table 1 shows composition formulas of the spinel, garnet, and hexa magnetic substances.

TABLE 1

| Classification according to types | | Composition |
|---|---|---|
| Spinel | | Me*Fe$_2$O$_2$ |
| Garnet | | R$_3$*Fe$_6$O$_{12}$ |
| Hexa | M type | BaFe$_{12}$O$_{19}$ |
| | W type | BaMe$_2$Fe$_{16}$O$_{27}$ |
| | Y type | Ba$_2$Me$_2$Fe$_{12}$O$_{22}$ |
| | Z type | Ba$_3$Me$_2$Fe$_{24}$O$_{41}$ |

In table 1, Me* refers at least one selected from the group consisting of cobalt (Co), nickel (Ni), zinc (Zn), copper (C), and manganese (Mn), and R* refers to yttrium (Y) elements.

The sandust magnetic substance includes the combination of iron (Fe), silicon (Si), and aluminum (Al), and the compositional ratios of the elements are 84%, 10%, and 6%, respectively.

The permalloy magnetic substance includes the composition of iron (Fe) and nickel (Ni), and the compositional ratios of the elements are 90% and 10%, respectively.

The first and second shielding units 61 and 62 may have different permeability values.

In this case, the permeability refers to the quantity representing the magnetic property of a material, and, that is, the ratio of the intensity of the magnetic field under a vacuum state to the magnetic flux density produced when the material is magnetized under the influence of the magnetic field. The permeability $\mu1$ of the first shielding unit 61 can be expressed through a complex number having a real component and an imaginary component as shown in Equation 1.

$$\mu1 = \mu11 + j\mu12 \qquad \text{Equation 1}$$

The real component $\mu11$ of the permeability $\mu1$ of the first shielding unit 61 may represent the extent to change (guide) the direction of the magnetic field came into the first shielding unit 61. In other words, as the value of the real component $\mu11$ is increased, the direction of the magnetic field came into the first shielding unit 61 may be much more changed. As the value of the real component $\mu11$ is reduced, the direction of the magnetic field came into the first shielding unit 61 may be less changed.

The imaginary component $\mu12$ of the permeability $\mu1$ of the first shielding unit 61 may represent the extent to absorb the magnetic field came into the first shielding unit 61 and convert the magnetic field into thermal energy. In other words, as the value of the imaginary component $\mu12$ is increased, the great quantity of the magnetic field came into the first shielding unit 61 may be converted into thermal energy to be discharged to the outside. As the value of the imaginary component $\mu12$ is reduced, the slight quantity of the magnetic field came into the first shielding unit 61 may be converted into thermal energy to be discharged to the outside.

According to one embodiment, the real component $\mu11$ of the permeability $\mu1$ of the first shielding unit 61 may be greater than the imaginary component $\mu12$ of the permeability $\mu1$ of the first shielding unit 61. In other words, the first shielding unit 61 mainly performs a function of changing the direction of the magnetic field rather than a function of minimizing the quantity of the magnetic field to be discharged to the outside. Accordingly, the real component $\mu11$ of the permeability $\mu1$ may be greater than the imaginary component $\mu12$.

Preferably, the ratio of the real component $\mu11$ of the permeability $\mu1$ of the first shielding unit 61 to the imaginary component $\mu12$ of the permeability $\mu1$ may be in the range from 10:1 to 1000:1. When the preferable ratio of the real component $\mu11$ of the permeability $\mu1$ of the first shielding unit 61 to the imaginary component $\mu12$ of the permeability $\mu1$ is at least 10:1, the first shielding unit 61 may more perform a function of changing the transmission path of the magnetic field rather than a function of absorbing the magnetic field and converting the magnetic field into heat to be discharged. In other words, if the ratio of the real component $\mu11$ of the permeability $\mu1$ of the first shielding unit 61 to the imaginary component $\mu12$ of the permeability $\mu1$ is less than 10:1, the first shielding unit 61 may not smoothly change the transmission path of the magnetic field, which is came into the first shielding unit 61, toward the wireless power reception apparatus.

In addition, regarding that the ratio of the real component $\mu11$ of the permeability $\mu1$ to the imaginary component $\mu12$ of the permeability $\mu1$ is preferably 1000:1 or less, if the ratio of the real component $\mu11$ of the permeability $\mu1$ to the imaginary component $\mu12$ of the permeability $\mu1$ is 1000:1 or above, the first shielding unit 61 may not perform an intrinsic function thereof at the frequency band used for the wireless power transmission due to the characteristic that the permeability of the magnetic material included in the first shielding unit 61 varies according to the frequencies.

According to one embodiment, the real component $\mu11$ of the permeability $\mu1$ and the imaginary component $\mu12$ of the permeability $\mu1$ may have values of about 30 to about 5000 due to the characteristic of materials included in the shielding material. Similarly, the real component $\mu21$ of the permeability $\mu2$ of the second shielding unit 62 and the imaginary component $\mu22$ of the permeability $\mu2$ may have values of about 30 to about 5000 due to the characteristic of materials included in the shielding material.

In addition, the permeability $\mu2$ of the second shielding unit 62 may be expressed through the complexity number having real and imaginary components as shown in Equation 2.

$$\mu2 = \mu21 + j\mu22. \qquad \text{Equation 2}$$

The real component $\mu21$ of the permeability $\mu2$ of the second shielding unit 62 may represent the extent to change (guide) the direction of the magnetic field came into the second shielding unit 62. In other words, as the value of the real component $\mu21$ is increased, the direction of the magnetic field came into the second shielding unit 62 may be much more changed. As the value of the real component $\mu21$ is reduced, the direction of the magnetic field came into the second shielding unit 62 may be less changed.

The imaginary component $\mu22$ of the permeability $\mu2$ of the second shielding unit 62 may represent the extent to absorb the magnetic field came into the second shielding unit 62 and convert the magnetic field into thermal energy. In other words, as the value of the imaginary component $\mu22$ is increased, the great quantity of the magnetic field came into the second shielding unit 62 may be converted into thermal energy to be discharged to the outside. As the value of the imaginary component μ22 is reduced, the slight quantity of the magnetic field came into the second shielding unit 62 may be converted into thermal energy to be discharged to the outside.

The imaginary component μ22 of the permeability μ2 of the second shielding unit 62 may be greater than the real component μ21. Preferably, the ratio of the imaginary component μ22 and the real component μ21 of the permeability μ2 of the second shielding unit 62 may be in the range from 1:1 to 10:1. Since the second shielding unit 62 mainly performs a function of minimizing the quantity of the magnetic field to be leaked to the outside rather than the function of changing the direction of the magnetic field, the imaginary component μ22 of the permeability μ2 must be greater than the real component μ21 of the permeability μ2. If the ratio of the imaginary component μ22 and the real component μ21 of the permeability μ2 of the second shielding unit 62 exceeds 10:1, the second shielding unit 62 may not perform the intrinsic function thereof at the frequency band used for the wireless power transmission due to the characteristic that the permeability of the magnetic material included in the second shielding unit 62 varies according the frequencies.

The first shielding unit 61 may be bonded to the second shielding unit 62 through a mechanical method such as a compression method or an adhesion method.

According to the compression method, the first and second shielding units 61 and 62 are bonded to each other by preparing the thin plates of the first and second shielding units 61 and 62 in a predetermined form by using a compressor at the room temperature. According to the adhesion method, the first and second shielding units 61 and 62 adheres to each other by using the adhesive strength between the interfacial surfaces of the first and second shielding units 61 and 62.

The first and second shielding units 61 and 62 may be bonded to each other through a thin film deposition method.

The thin film deposition method is a method in which metal or compound is heated and evaporated under the vacuum state so that the vapor is coated on the surface of a matter in the form of a thin film. The thin film deposition method is classified into a physical vapor deposition (PVD) method or a chemical vapor deposition (CVD) method.

Since the PVD method or the CVD method is generally known in the art, the details thereof will be omitted.

Although the shielding apparatus 60 may be used in relation to wireless power transmission as described above, the shielding apparatus 60 is applicable to a communication method such as a radio-frequency identification (RFID) method, a near field communication (NFC) method, or a keyless entry method.

In this case, a transmission apparatus employing the communication method such as the RFID method, the NFC method, or the keyless entry method is used instead of the wireless power transmission apparatus 100.

Figure 6:
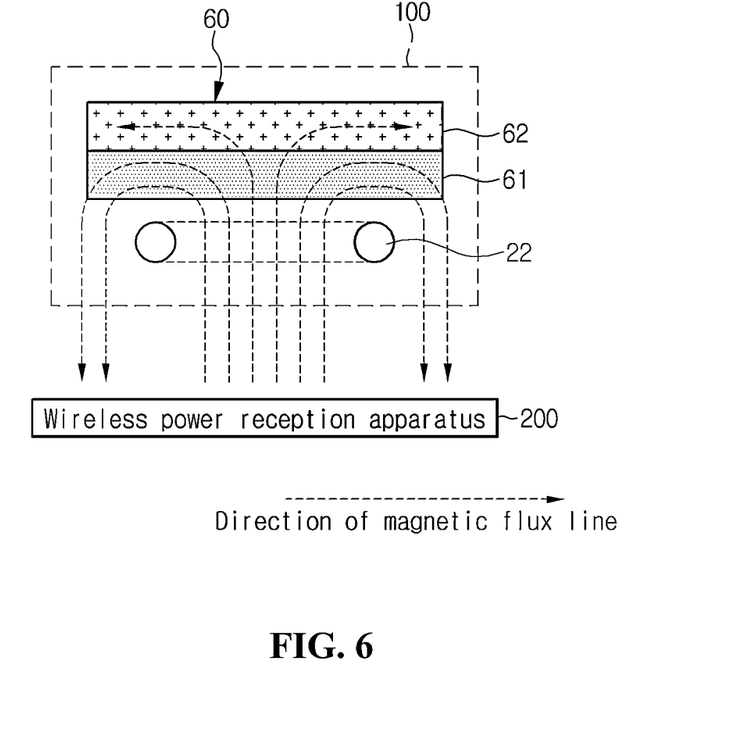
FIG. 6 is a view showing the structure of the wireless power transmission system employing a wireless power transmission apparatus according to one embodiment of the disclosure.

FIG. 6 is a view showing the structure of the wireless power transmission system employing the wireless power transmission apparatus according to one embodiment of the disclosure.

The wireless power transmission system may include the wireless power transmission apparatus 100 and the wireless power reception apparatus 200.

The wireless power transmission apparatus 100 may include the power transmitting unit 20 and the shielding apparatus 60.

The power transmitting unit 20 may include the transmission induction coil 21, the transmission resonance coil 22, and a capacitor. The detail thereof has been already described with reference to FIG. 1.

The power transmitting unit 20 receives power from the power source 10 to transmit the magnetic field, which is generated from the transmission resonance coil 22, to the reception resonance coil 31 of the wireless power reception apparatus 200 through a non-radiation method.

The shielding unit 60 includes the first and second shielding units 61 and 62. The first shielding unit 61 can change the transmission path of a portion of a magnetic field transmitted from the wireless power transmission apparatus 100 to the wireless power reception apparatus 200, and the second shielding unit 62 can shield a portion of the magnetic field passing through the first shielding unit 61 and exposed to the outside.

Referring to the magnetic flux line of FIG. 6, a portion of the magnetic field generated from the transmission resonance coil 22 does not completely pass through the first shielding unit 61, but is directed toward the wireless power reception apparatus 200 by the first shielding unit 61. To this end, the first shielding unit 61 may include silver representing permeability μ1 having the real component value μ11 greater than the imaginary component value μ12. According to the embodiment, the ratio of the real component μ11 to the imaginary component μ12 may be at least 100:1.

Referring to the magnetic flux line of FIG. 6, a portion of the magnetic field passing through the first shielding unit 61 is absorbed by the second shielding unit 61.

In other words, the second shielding unit 62 can shield the magnetic field which has been generated from the transmission resonance coil 22 and has passed through the first shielding unit 61. In more detail, the second shielding unit 62 absorbs a portion of the magnetic field, which has passed through the first shielding unit 61, and converts the portion of the magnetic field into thermal energy, so that the magnetic field can be inhibited from being leaked to the outside. To this end, the second shielding unit 62 may include a material representing permeability μ2 having the imaginary component value μ22 greater than the real component value μ21.

As described above, the first shielding unit 61 can transmit a greater amount of power to the wireless power reception apparatus 200 by changing the direction of the magnetic field generated from the transmission resonance coil 22.

In addition, the second shielding unit 62 absorbs a portion of the magnetic field, which has passed through the first shielding unit 61 and discharges the absorbed of the magnetic field as thermal energy, thereby minimizing the quantity of the magnetic field to be leaked to the outside. If the quantity of the magnetic field to be leaked to the outside is minimized, another device can be inhibited from erroneously operating and the harmful magnetic field can be inhibited from being exposed to the human body.

In other words, according to the embodiment of the disclosure, the shielding unit 60 having a multi-layer structure increases the power transmission efficiency to the wireless power reception apparatus 200 while minimizing the quantity of the magnetic field to be leaked to the outside.

The shielding unit 60 according to the embodiment of the disclosure is installed in a transmission apparatus communicating with a reception apparatus using a magnetic field in addition to the wireless power transmission technology, thereby increasing the power transmission efficiency while minimizing the quantity of the magnetic field to be leaked to the outside.

Figure 7:
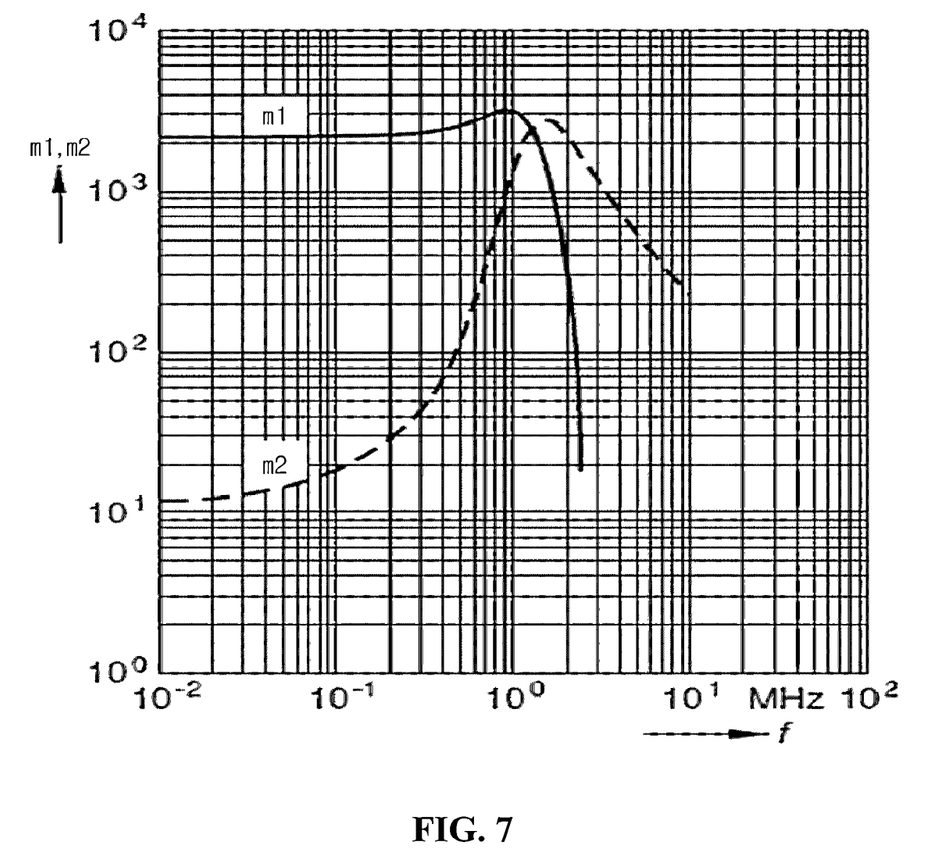
FIG. 7 is a graph showing the variation in real and imaginary component values of a permeability of a shielding member according to the use frequencies for wireless power transmission.

FIG. 7 is a graph showing the variation in real and imaginary component values of permeability of a shielding material according to the use frequencies for wireless power transmission.

FIG. 7 is a graph showing the variation characteristic of the permeability of typical ferrites according to the use frequencies for the wireless power transmission.

Referring to FIG. 7, the real and imaginary components μ1 and μ2 of the permeability μ of the shielding material are varied according to the variation of the use frequency for the wireless power transmission. In other words, if the use frequency is determined, the real and imaginary components of the permeability according to the determined use frequency are determined. Accordingly, a shielding unit employing the shielding material is determined as described with reference to FIG. 5.

For example, if the use frequency for the wireless power transmission is 0.1 MHz, the real component μ1 is about 20, and the imaginary component μ2 is about 2000, so that the imaginary component is 100 times greater than the real component. In this case, the shielding material may constitute the second shielding unit 61 for absorbing the magnetic field to discharge heat.

In the graph of FIG. 7, the curves of the real and imaginary components μ1 and μ2 may have various forms according to the materials used as a shielding material. Accordingly, a user can design the shielding unit 60 by selecting a desirable shielding material according to the use frequency.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A shielding apparatus included in a wireless power transmission apparatus for wirelessly transmitting power to a wireless power reception apparatus, the shielding apparatus comprising:
   a first shielding unit having a first permeability; and
   a second shielding unit having a second permeability;
   wherein the second shielding unit is disposed on the first shielding unit;
   wherein the first shielding unit changes a transmission path of a portion of a magnetic field generated from a transmission coil of the wireless power transmission apparatus by the first permeability;
   wherein the second shielding unit shields the portion of the magnetic field that has passed through the first shielding unit due to the second permeability;
   wherein each of the first permeability and the second permeability is expressed as a complex number having a real component and an imaginary component;
   wherein the real component value of the first permeability is greater than the imaginary component value of the first permeability, and the imaginary component value of the second permeability is greater than the real component value of the second permeability;
   wherein the magnetic field is generated to transmit the power to the wireless power reception apparatus;
   wherein the first shielding unit and the second shielding unit are disposed opposite to a direction in which the transmission coil transmits the power;
   wherein the first shielding unit transmits the portion of the magnetic field to the wireless power reception apparatus by changing the transmission path of the portion of the magnetic field;
   wherein the second shielding unit absorbs the portion of the magnetic field that has passed through the first shielding unit to discharge the magnetic field as heat;
   wherein the real component value of each permeability represents an extent to change the transmission path of the magnetic field, and the imaginary component value of each permeability represents an extent to absorb the portion of the magnetic field that has passed through the first shielding unit to discharge the magnetic field as heat; and
   wherein the real component value of the permeability of the first shielding unit is in a range of 10 times to 1000 times greater than the imaginary component value of the permeability of the first shielding unit, and the imaginary component value of the permeability of the second shielding unit is in a range of one time to 10 times greater than the real component value of the permeability of the second shielding unit.

2. The shielding apparatus of claim 1, wherein the real and imaginary component values of each permeability are in a range of 30 to 5000.

3. The shielding apparatus of claim 1, wherein the first shielding unit and the second shielding unit include different types of magnetic substances.

4. The shielding apparatus of claim 3, wherein the first and second shielding units include one of spinel, hexa, sandust, and permalloy magnetic substances.

5. The shielding apparatus of claim 1, wherein the first and second shielding units are bonded to each other through a compression method or an adhesive method.

6. The shielding apparatus of claim 1, wherein the first and second shielding units are bonded to each other through a thin film deposition method.

7. A wireless power transmission apparatus for transmitting power to a wireless power reception apparatus in wireless, the wireless power transmission apparatus comprising:
   a transmission unit receiving power from a power source and transferring a magnetic field generated from a transmission coil to a reception coil of the wireless power reception apparatus through a non-radiation method; and
   a shielding device including a first shielding unit having a first permeability, and a second shielding unit having a second permeability;
   wherein the second shielding unit is disposed on the first shielding unit;
   wherein the first shielding unit changes a transmission path of a portion of the magnetic field generated from the transmission coil by the first permeability;
   wherein the second shielding unit shields the portion of the magnetic field that has passed through the first shielding unit due to the second permeability;
   wherein each of the first permeability and the second permeability is expressed as a complex number having a real component and an imaginary component;
   wherein the real component value of the first permeability is greater than the imaginary component value of the first permeability, and the imaginary component value of the second permeability is greater than the real component value of the second permeability;
   wherein the magnetic field is generated to transmit the power to the wireless power reception apparatus;

wherein the first shielding unit and the second shielding unit are disposed opposite to a direction in which the transmission coil transmits the power;

wherein the first shielding unit transmits the portion of the magnetic field to the wireless power reception apparatus by changing the transmission path of the portion of the magnetic field;

wherein the second shielding unit absorbs the portion of the magnetic field that has passed through the first shielding unit to discharge the magnetic field as heat;

wherein the real component value of each permeability represents an extent to change the transmission path of the magnetic field generated from the transmission coil, and the imaginary component value of each permeability represents an extent to absorb the portion of the magnetic field that has passed through the first shielding unit to discharge the magnetic field as heat; and wherein the real component value of the permeability of the first shielding unit is in a range of 10 times to 1000 times greater than the imaginary component value of the permeability of the first shielding unit, and the imaginary component value of the permeability of the second shielding unit is in a range of one time to 10 times greater than the real component value of the permeability of the second shielding unit.

8. The wireless power transmission apparatus of claim 7, wherein the transmission unit transmits the power to the wireless power reception apparatus by using electromagnetic induction.

9. The wireless power transmission apparatus of claim 7, wherein the transmission unit transmits the power to the wireless power reception apparatus by using reactance.

10. A shielding apparatus included in a transmission apparatus communicating with a reception apparatus by using a magnetic field, the shielding apparatus comprising:
   a first shielding unit having a first permeability; and
   a second shielding unit having a second permeability;
   wherein the second shielding unit is disposed on the first shielding unit;
   wherein the first shielding unit changes a transmission path of a portion of a magnetic field generated from the transmission apparatus to the reception apparatus by the first permeability;
   wherein the second shielding unit shields the portion of the magnetic field that has passed through the first shielding unit due to the second permeability;
   wherein each of the first permeability and the second permeability is expressed as a complex number having a real component and an imaginary component;
   wherein the real component value of the first permeability is greater than the imaginary component value of the first permeability, and the imaginary component value of the second permeability is greater than the real component value of the second permeability;
   wherein the magnetic field is generated to transmit the power to the reception apparatus;
   wherein the first shielding unit and the second shielding unit are disposed opposite to a direction in which a transmission coil transmits the power;
   wherein the first shielding unit transmits the portion of the magnetic field to the reception apparatus by changing the transmission path of the portion of the magnetic field, and the second shielding unit absorbs the portion of the magnetic field that has passed through the first shielding unit to discharge the magnetic field as heat; and
   wherein the real component value of the permeability of the first shielding unit is in a range of 10 times to 1000 times greater than the imaginary component value of the permeability of the first shielding unit, and the imaginary component value of the permeability of the second shielding unit is in a range of one time to 10 times greater than the real component value of the permeability of the second shielding unit.

11. The shielding apparatus of claim 10, wherein the transmission apparatus communicates with the reception apparatus by using at least one of a radio-frequency identification method, a near field communication method, and a keyless entry method.

* * * * *